United States Patent
Knoll et al.

(10) Patent No.: US 6,197,889 B1
(45) Date of Patent: Mar. 6, 2001

(54) THERMOPLASTIC ELASTOMERIC BLOCK COPOLYMERS

(75) Inventors: Konrad Knoll, Ludwigshafen; Hermann Gausepohl, Mutterstadt; Norbert Niessner, Friedelsheim; Paul Naegele, Otterstadt; Wolfgang Fischer, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 08/981,051

(22) PCT Filed: Apr. 3, 1997

(86) PCT No.: PCT/EP97/01670

§ 371 Date: Dec. 11, 1997

§ 102(e) Date: Dec. 11, 1997

(87) PCT Pub. No.: WO97/40079

PCT Pub. Date: Oct. 30, 1997

(30) Foreign Application Priority Data

Apr. 19, 1996 (DE) .............................. 196 15 533

(51) Int. Cl.⁷ ..................... C08F 293/00; C08F 297/00
(52) U.S. Cl. .............................................. 525/314
(58) Field of Search ...................... 525/314, 316

(56) References Cited

U.S. PATENT DOCUMENTS

| 3,507,934 | 4/1970 | Minor et al. . |
| 3,639,517 | 2/1972 | Kitchen et al. . |
| 4,086,298 | 4/1978 | Fahrbach et al. . |
| 4,122,134 | 10/1978 | Miki et al. . |
| 4,167,545 | 9/1979 | Fahrbach et al. . |
| 5,385,994 | 1/1995 | Graves et al. ........................ 526/181 |
| 5,910,546 | * 6/1999 | Trepka ................. 525/314 |

FOREIGN PATENT DOCUMENTS 44 20 952  6/1994 (DE) .

OTHER PUBLICATIONS

Smith et al., *Polymer Preprints* 34(2), 1993, pp. 672–673.
Smith et al., *Polymer Preprints* 35(2), 1994, pp. 466–467.
Tung et al., *Adv. in Elastomers and Rubber Elasticity*, 1986, pp. 129–142.
Ayala et al., *Poly. Mat. Sci. & Eng.*, vol. 73, 1995, pp. 535–536.

* cited by examiner

Primary Examiner—Christopher Henderson
(74) Attorney, Agent, or Firm—Keil & Weinkauf

(57) ABSTRACT

Elastomeric block copolymers comprising at least one hard block A composed of styrene monomers and at least one elastomeric block (B/A) composed of styrene monomers and dienes, the glass transition temperature $T_g$ of the block A being more than 25° C. and that of block (B/A) being less than 25° C. and the phase volume ratio of block A to block (B/A) being chosen so that the proportion of the hard phase in the total block copolymer is from 1 to 40% by volume and the amount by weight of the diene is less than 50% by weight, and the relative proportion of 1,2 linkages of the polydiene, based on the sum of 1,2- and 1,4-cis/trans linkages, being below 15%, are prepared by anionic polymerization by means of a lithium alkyl in a nonpolar solvent in the presence of a soluble potassium salt and are used for the production of shaped articles.

14 Claims, No Drawings

THERMOPLASTIC ELASTOMERIC BLOCK COPOLYMERS

BACKGROUND OF THE INVENTION

Block copolymers of vinylaromatics (eg. styrene) and dienes (eg. butadiene) are copolymers of a plurality of polymer molecular segments (ie. blocks) which are arranged in series or otherwise linked and have a more or less uniform composition. Depending on the structure and content of diene monomers, they may have overall—at a certain temperature—elastomeric properties or rigid, nonelastomeric properties, ie. as a whole they either exhibit elastomeric behavior similar to a polydiene and are important, for example, as SB rubber, or they behave as transparent, impact-resistant styrene polymers. Similarly to the definitions in the case of toughened polystyrene, it is usual to refer to those moieties which determine the elastomeric behavior as the soft phase and to the rigid moieties (the pure polystyrene fraction) as the hard phase. SB rubbers must be vulcanized in the same way as the usual diene polymers for use, which greatly restricts their use and makes processing more expensive.

The present invention relates to usually transparent block copolymers of vinylaromatics and dienes, which block copolymers can be processed by a purely thermoplastic method and have elastomeric behavior and particular mechanical and improved thermal properties.

The following must thus be mentioned in this context:

The anionic polymerization which leads to living polymers and in which the growth of a chain molecule takes place at a chain end which, in the absence of a spontaneous chain termination or transfer reaction, theoretically lives for an unlimited time (remains polymerizable), and the reaction of the living polymer with monofunctional or polyfunctional reactants is known to be a versatile possible method for synthesizing block copolymers, although the choice of monomers is limited; in practice, only block copolymers of vinylaromatic compounds, ie. styrene and its derivatives on the one hand and dienes, essentially butadiene or isoprene, on the other hand, have become important. Block copolymers are obtained by in each case carrying out polymerization until a monomer stock is virtually exhausted and then changing the monomer or monomers. This process can be repeated several times.

Linear block copolymers are described, for example, in U.S. Pat. Nos. 3,507,934 and 4,122,134. Star block copolymers are disclosed, for example, in U.S. Pat. Nos. 4,086,298; 4,167,545 and 3,639,517.

The property profile of these block copolymers is essentially characterized by the content of polymerized diene monomers, ie. the length, arrangement and ratio of polydiene and polystyrene blocks. Moreover, the type of transition between different blocks plays an important role. The influence of crisp and tapered transitions (depending on whether the monomer change is abrupt or gradual) is explained in detail in DE-A1-44 20 952, so that further description is unnecessary here.

It is merely necessary to point out that, in block copolymers having a tapered block transition, the sequence lengths are by no means randomly distributed but that the sequence length of the pure diene phase compared with the polystyrene phase and hence the volume ratio are shifted in favor of the diene phase. This has the disadvantage that the poor properties of the diene polymer are unnecessarily strongly evident in the material behavior during processing.

In particular, materials having a diene content of more than 35% by weight, which, owing to their property profile (toughness, transparency, gas permeability), would be suitable for medical applications, such as infusion tubes, infusion drip chambers and stretch films, can be processed by profile extrusion, injection molding or tubular film extrusion only with very great difficulty; in spite of stabilization with antioxidants and free radical acceptors, they are very heat-sensitive and tend to become tacky, necessitating an expensive remedy with additives. Blocking (sticking of films and tubes to the roll) and poor mold release properties may make processing by injection molding completely impossible.

DE-A1-44 20 952 has therefore proposed in this context the preparation of an elastomeric block copolymer which consists of at least one block A having polymerized units of a vinylaromatic monomer and forming a hard phase and/or a block B containing diene monomers and forming a first elastomeric (soft) phase and at least one elastomeric block (B/A) having polymerized units of a vinylaromatic monomer and of a diene and forming a soft phase or a further soft phase, the glass transition temperature $T_g$ of block A being above 25° C. and that of block (B/A) being below 25° C. and the phase volume ratio of block A to block (B/A) being chosen so that the proportion of the hard phase in the total block copolymer is 1–40% by volume and the amount of the diene is less than 50% by weight. These block copolymers already constitute a considerable advance over the previously known block copolymers having tapered block transitions. However, materials having a diene content of up to 35% also tend to form gels (crosslinking via the olefinically unsaturated chain elements) when subjected to prolonged thermal stress and shear stress, as occur in particular during extrusion. Particularly in the production of films, gel particles may be evident as troublesome specks. The tendency to crosslink is ascribed in particular to the short chain branches present in polydienes, ie. side chains having the structure

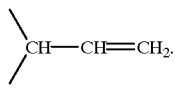

DETAILED DESCRIPTION OF THE INVENTION

It is an object of the present invention to obtain, by suitable choice of the molecular structure, elastomeric block copolymers which can be easily produced on a large industrial scale, have maximum toughness with a low diene content and can be processed in the same way as thermoplastics in extruders and injection molding machines in a simple manner and in particular without troublesome gel formation.

We have found that this object is achieved in general, according to the invention, if, in a vinylaromatic/diene block copolymer comprising blocks which form a hard phase (block type A) and those which form a soft phase, a pure polydiene block (block type B), as the soft phase, is replaced by a block (B/A) of diene and vinylaromatic units which has a strictly random structure, the relative amount of 1,2 linkages of the polydiene, based on the sum of 1,2- and 1,4-cis/trans-linkages, always being below about 12 to 15%. As a statistical average, the structure may be homogeneous or inhomogeneous along the chain.

The present invention directly relates to an elastomeric block copolymer comprising at least one block A having polymerized units of a vinylaromatic monomer and forming a hard phase and at least one elastomeric block (B/A) having polymerized units of a vinylaromatic monomer and of a diene and forming a soft phase, the glass transition temperature $T_g$ of block A being above 25° C. and that of block (B/A) being below 25° C. and the phase volume ratio of block A to block (B/A) being chosen so that the proportion of the hard phase in the total block copolymer is from 1 to 40% by volume and the amount of the diene is less than 50% by weight, the relative amount of 1,2 linkages of the polydiene, based on the sum of 1,2- and 1,4-cis/trans-linkages, being less than from about 12 to 15%.

The vinylaromatic monomer is preferably chosen from styrene, a-methylstyrene, vinyltoluene and 1,1-diphenylethylene, and the diene from butadiene and isoprene.

Such a novel elastomeric block copolymer having less tendency to crosslink is obtained if, within the above parameters, the soft phase is formed from a random copolymer of a vinylaromatic with a diene; random copolymers of vinylaromatics and dienes are obtained by polymerization in the presence of a potassium salt soluble in nonpolar solvents. The random copolymerization of styrene and butadiene in cyclohexane in the presence of soluble potassium salts is described by S. D. Smith, A. Ashraf et al. in Polymer Preprints 34(2) (1993), 672, and 35(2) (1994), 466. Potassium 2,3-dimethyl-3-pentanolate and potassium 3-ethyl-3-pentanolate are mentioned as soluble potassium salts.

In principle, it is possible to produce random copolymers by adding polar, coordinative solvents, as described in DE-A1-44 20 952, the said copolymers resulting, in a higher proportion of 1,2 linkages. The difference, according to the invention, from the method described there is that the ratio of the 1,2- to 1,4 linkages of the diene is not changed by adding the potassium salt. When the amount of potassium salt required for strictly random copolymerization of, for example, styrene and butadiene is added, the relative proportion of the 1,2-vinyl structure remains below 15%, in an advantageous case below about 11–12%, based on the sum of 1,2-vinyl and 1,4-cis/trans microstructure. In the case of butyllithium-initiated polymerization in cyclohexane, the molar ratio of lithium to potassium in this case is from about 10:1 to 40:1. If a composition gradient (ie. a composition changing more or less fluently within the scope of the invention from butadiene to styrene) is desired along the random block, Li/K ratios greater than 40:1 should be chosen, and ratios of less than 10:1 in the case of a gradient from styrene to butadiene.

A novel block copolymer can be represented, for example, by one of the general formulae 1 to 11:

$$(A-(B/A))_n; \tag{1}$$

$$(A-(B/A))_n-A; \tag{2}$$

$$(B/A)-(A-(B/A))_n; \tag{3}$$

$$X-[(A-(B/A))_n]_m+1; \tag{4}$$

$$X-[((B/A)-A)_n]_m+1; \tag{5}$$

$$X-[A-(B/A))_n-A]_m+1; \tag{6}$$

$$X-[((B/A)-A)_n-(B/A)]_m+1; \tag{7}$$

$$Y-[(A-(B/A))_n]_m+1; \tag{8}$$

$$Y-[((B/A)-A)_n]_m+1; \tag{9}$$

$$Y-[(A-(B/A))_n-A]_m+1; \tag{10}$$

$$Y-[((B/A)-A)_n-(B/A)]_m+1; \tag{11}$$

where A is the vinylaromatic block and (B/A) is the soft phase, ie. the block comprising random diene and vinylaromatic units, X is a radical of an n-functional initiator, Y is a radical of an m-functional coupling agent and m and n are natural numbers from 1 to 10.

A preferred block copolymer is one of the general formulae $A-(B/A)-A$, $X-[-(B/A)-A]_2$ and $Y-[-(B/A)-A]_2$ (for the meanings of abbreviations, see above) and a particularly preferred block copolymer is one whose soft phase is divided into blocks $$(B/A)_1-(B/A)_2; \tag{12}$$

$$(B/A)_1-(B/A)_2-(B/A)_1; \tag{13}$$

$$(B/A)_1-(B/A)_2-(B/A)_3; \tag{14}$$

where the blocks have different compositions or their vinylaromatic/diene ratio in the individual blocks (B/A) changes in such a way that a composition gradient $(B/A)_{p1}<<(B/A)_{p2}<<(B/A)_{p3}\ldots$ occurs in each segment (part-block), the glass transition temperature $T_g$ of each part-block being less than 25° C. Such block copolymers which have within a block (B/A), for example, p repeating segments (part-blocks) with changing monomer composition can be formed by addition of p portions of the monomers, where p is an integer from 2 to 10 (cf. also the examples below). The addition a little at a time may serve, for example, to control the heat balance in the reaction mixture.

A block copolymer which has a plurality of blocks (B/A) and/or A, each having a different molecular weight per molecule, is likewise preferred.

It is also possible for a block A composed exclusively of vinylaromatic units to be replaced by a block B since all that is important is that an elastomeric block copolymer is formed. Such copolymers may have, for example, the structures (15) to (18)

$$B-(B/A) \tag{15}$$

$$(B/A)-B-(B/A) \tag{16}$$

$$(B/A)_1-B-(B/A)_2 \tag{17}$$

$$B[(B/A)_1-(B/A)_2]_2. \tag{18}$$

Novel block copolymers are very suitable for the production of elastomeric shaped articles by the conventional methods for processing thermoplastics, for example as film, foam, is thermoformed molding, injection molding or extruded profile.

For the purposes of the present invention, preferred vinylaromatic compounds are styrene and furthermore α-methylstyrene and vinyltoluene and mixtures of these compounds. Preferred dienes are butadiene and isoprene, and furthermore piperylene, 1-phenylbutadiene and mixtures of these compounds.

A particularly preferred monomer combination comprises butadiene and styrene. All weights and volumes stated below are based on this combination; if the technical equivalents of styrene and butadiene are used, it may be necessary to convert the data appropriately.

The (B/A) block is composed of, for example, 75–40% by weight of styrene and 25–60% by weight of butadiene. Particularly preferably, a soft block has a butadiene content of from 35 to 70% and a styrene content of from 65 to 30%.

In the case of the monomer combination styrene/butadiene, the amount by weight of the diene in the total block copolymer is 15–65% by weight and that of the vinylaromatic component is accordingly 85–35% by weight. Butadiene/styrene block copolymers having a monomer composition comprising 25–60% by weight of diene and 75–40% by weight of vinylaromatic compound are particularly preferred.

The block polymers are prepared by anionic polymerization in a nonpolar solvent, initiation being effected by means of organometallic compounds. Compounds of the alkali metals, in particular of lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The dose depends on the intended molecular weight of the polymer but is, as a rule, from 0.002 to 5 mol %, based on the monomers. Preferably used solvents are aliphatic hydrocarbons, such as cyclohexane and methylcyclohexane.

According to the invention, the random blocks of the block copolymers, which blocks simultaneously contain vinylaromatic and diene, are prepared with the addition of a soluble potassium salt, in particular of a potassium alcoholate. It is believed that the potassium salt undergoes metal exchange with the lithium-carbanion ion pair, potassium carbanions being formed and preferably undergoing an addition reaction with styrene, while lithium cabanions preferably undergo an addition reaction with butadiene. Because potassium carbanions are substantially more reactive, a small fraction, ie. from $\frac{1}{10}$ to $\frac{1}{40}$, is sufficient on average, together with the predominant lithium carbanions, to make the incorporation of styrene and butadiene equally probable. Furthermore, it is believed that metal exchange frequently occurs between the living chains and between a living chain and the dissolved salt during the polymerization process, so that the same chain preferably undergoes addition with styrene on the one hand and then with butadiene on the other hand. Consequently, the copolymerization parameters are then virtually the same for styrene and butadiene. Particularly suitable potassium salts are potassium alcoholates, in this case in particular tertiary alcoholates of at least 7 carbon atoms. Typical corresponding alcohols are, for example, 3-ethyl-3-pentanol and 2,3-dimethyl-3-pentanol. Tetrahydrolinalool (3,7-dimethyl-3-octanol) has proven particularly suitable. In addition to the potassium alcoholates, other potassium salts which are inert to metal alkyls are in principle also suitable. Examples of these are dialkyl potassium amides, alkylated diaryl potassium amides, alkyl thiolates and alkylated aryl thiolates.

The time when the potassium salt is added to the reaction medium is important. Usually, at least parts of the solvent and the monomer for the first block are initially taken in the reaction vessel. It is not advisable to add the potassium salt at this time as it is at leas partially hydrolyzed to KOH and alcohol by traces of protic impurities. The potassium ions are then irreversibly deactivated for the polymerization. The lithium organyl should therefore be added first and mixed in before the potassium salt is added. If the first block is a homopolymer, it is advisable to add the potassium salt only shortly before the polymerization of the random block.

The potassium alcoholate can readily be prepared from the corresponding alcohol by stirring a cyclohexane solution in the presence of excess potassium-sodium alloy. After 24 hours at 25° C., the devolution of hydrogen and hence the reaction are complete. However, the reaction can also be shortened to a few hours by refluxing at 80° C. An alternative reaction involves adding a small excess of potassium methylate, potassium ethylate or potassium tert-butylate to the alcohol in the presence of a high-boiling inert solvent, such as decalin or ethylbenzene, distilling off the low-boiling alcohol, in this case methanol, ethanol or tert-butanol, diluting the residue with cyclohexane and filtering off the solution from excess sparingly soluble alcoholate.

As a result of the addition of the potassium compound, the proportion of 1,2 linkages as a ratio of the sum of 1,2 and 1,4 linkages of the diene reaches in general from 11 to 9%. In comparison, when a Lewis base according to DE-A1-44 20 952 is used, the proportion of 1,2 and 1,4 linkages of the diene units reaches, for example, 15–40% for the 1,2 linkages and 85–60% for the 1,4 linkages, based in each case on the total amount of polymerized diene units.

The polymerization temperature may be from 0 to 130° C., preferably from 30 to 100° C.

The amount by volume of the soft phase in the solid is of decisive importance for the mechanical properties. According to the invention, the amount by volume of the soft phase composed of diene and vinylaromatic sequences is 60–95, preferably 70–90, particularly preferably 80–90,% by volume. The blocks A formed from the vinylaromatic monomers form the hard phase, the amount by volume accordingly accounts for 5–40, preferably 10–30, particularly preferably 10–20,% by volume.

It should be pointed out that there is no strict agreement between the abovementioned ratios of vinylaromatic compound and diene, the abovementioned limits of phase volumes and the composition which results from the novel ranges of the glass transition temperature, since they are in each case numerical values rounded to full tens. Rather, any such relationship could be merely accidental.

The amount by volume of the two phases can be measured by high-contrast electron microscopy or solid-state NMR spectroscopy. The amount of the vinylaromatic blocks can be determined by precipitation and weighing after osmium degradation of the polydiene fraction. The future phase ratio of a polymer can also be calculated from the amounts of monomers used if complete polymerization is permitted in each case.

For the purposes of the present invention, the block copolymer is unambiguously defined by the quotient of the volume fraction as a percentage of the soft phase formed from the (B/A) blocks and the fraction of diene units in the soft phase, which is from 25 to 70% by weight for the styrene/butadiene combination.

The glass transition temperature ($T_g$) is influenced by the random incorporation of the vinylaromatic compounds in to the soft block of the block copolymer and the use of potassium alcoholates during the polymerization. A glass transition temperature from −50 to +25° C., preferably from −50 to +5° C., is typical. In the case of the novel potassium-catalyzed random copolymers, the glass transition temperature is on average 2–50 lower than in the case of the corresponding products catalyzed by a Lewis base, because the latter have a higher proportion of 1,2-butadiene linkages. 1,2-Polybutadiene has a glass transition temperature which is 70–900 higher than that of 1,4-polybutadiene.

The molecular weight of block A is in general from 1000 to 200,000, preferably from 3000 to 80,000, g/mol. Within a molecule, A blocks may have different molecular weights.

The molecular weight of the block (B/A) is usually from 2000 to 250,000, preferably from 5000 to 150,000, g/mol.

As in the case of a block A, a block (B/A), too, may have different molecular weights within a molecule.

The coupling center X is formed by the reaction of the living anionic chain ends with a bifunctional or polyfunctional coupling agent. Examples of such compounds are described in U.S. Pat. Nos. 3,985,830, 3,280,084, 3,637,554 and 4,091,053. For example, epoxidized glycerides, such as epoxidized linseed oil oz soybean oil, are preferably used; divinylbenzene is also suitable. Dichlorodialkylsilanes, dialdehydes, such as terephthalaldehyde, and esters, such as ethyl formate or ethyl benzoate, are particularly suitable for the dimerization.

Preferred polymer structures are A–(B/A)–A; X–[–(B/A)–A]$_2$ and Y–[–(B/A)–A]$_2$, where the random block (B/A) itself can in turn be subdivided into blocks (B$_1$/A$_1$)–(B$_2$/A$_2$)–(B$_3$/A$_3$)– . . . The random block preferably consists of from 2 to 15, particularly preferably from 3 to 10, random part-blocks. The subdivision of the random block (B/A) into a very large number of part-blocks B$_n$/A$_n$ has the decisive advantage that the (B/A) block as a whole behaves like a virtually perfect random polymer even in the case of a continuously changing composition (a gradient) within a part-block B$_n$/A$_n$, as is difficult to avoid in the anionic polymerization under practical conditions (see below). It is therefore useful to add less than the theoretical amount of potassium alcoholate. A larger or a smaller proportion of the part-blocks can be provided with a high diene content. This results in the polymer retaining a residue of toughness and not becoming completely brittle even below the glass transition temperature of the predominant (B/A) blocks.

The novel block copolymers have a property spectrum very similar to that of soft PVC but can be prepared completely free of low molecular weight plasticizers capable of migration. Under the usual processing conditions (from 180 to 220° C.), they are stable to crosslinking. The excellent stability of the novel polymers to crosslinking can be clearly demonstrated by means of rheography. The experimental setup corresponds to that of the MVR measurement. At constant melt flow rate, the pressure increase as a function of time is recorded. The novel polymers show no pressure increase even after 20 minutes at 250° C. and give a smooth melt extrudate, whereas, under the same conditions, a comparative sample produced with THP according to DE-A1-44 20 952 exhibits a tripling of the pressure and its extrudate has a barbed wire appearance typical of crosslinking.

The novel block copolymers are furthermore distinguished by high oxygen permeation P$_O$ and water vapor permeation P$_W$ of more than 2000 [cm$^3$·100 mm/m$^2$·d·bar] and more than 10 [g 100 mm/m$^2$-d-bar], respectively, where P$_O$ is the amount of oxygen in cm$^3$ and P$_W$ is the amount of water vapor in grams which pass through 1 m$^2$ of film with a standard thickness of 100 mm per day and per bar of partial pressure difference.

A high restoring force on deformation, as observed in the case of thermoplastic elastomers, high transparency (more than 90% at 10 mm layer thickness), a low welding temperature of less than 120° C. and a broad welding range (over 5°) in combination with moderate tack make the novel block copolymers a suitable starting material for the production of stretch films, infusion tubes and other extruded, injection molded, thermoformed or blown finished articles which have to have high transparency and toughness, in particular for applications in medicine.

Polymerization is carried out in a plurality of stages and, in the case of monofunctional initiation, is started, for example, with the preparation of the hard block A. A part of the monomers is initially taken in the reactor and the polymerization is initiated by adding the initiator. In order to achieve a defined chain structure which can be calculated from the monomer and initiator dose, it is advisable to carry out the process up to a high conversion (more than 99%) before the second monomer addition. However, this is not absolutely essential.

The order of the monomer addition depends on the chosen block structure. In the case of monofunctional initiation, for example, the vinylaromatic compound is either initially taken or directly metered in. A cyclohexane solution of the potassium alcoholate is then added. Diene and vinylaromatic should then be added as far as possible simultaneously. The addition may be effected in a plurality of portions, for example to facilitate heat removal. The random structure and the composition of the block (B/A) are determined by the ratio of diene to vinylaromatic compound, the concentration of the potassium salt and the temperature. According to the invention, the amount by weight of the diene is from 25 to 70% relative to the total mass, including vinylaromatic compound. Block A can then be polymerized on by adding the vinylaromatic. Instead, required polymer blocks can also be linked to one another by the coupling reaction. In the case of bifunctional initiation, the (B/A) block is first synthesized, followed by the A block.

Further working up is carried out by the conventional methods. It is advisable to work in a stirred kettle and to protonate the carbanions with an alcohol, such as isopropanol, to render the mixture weakly acidic prior to further working up in a conventional manner with CO$_2$/water, to stabilize the polymer with an oxidation inhibitor and a free radical acceptor (commercial products, such as trisnonylphenyl phosphite (TNPP) or alpha-tocopherol (vitamin E or products obtainable under the trade names Irganox 1076 or Irganox 3052)), to remove the solvent by the conventional methods and to carry out extrusion and granulation. The granules can be protected from adhesion, as in the case of other rubber grades, with an antiblocking agent, such as ®Acrawax, ®Besquare or ®Aerosil.

EXAMPLES

For each example, a simultaneously heatable and coolable 50 liter stainless steel autoclave which was equipped with a cross-arm stirrer was prepared by flushing with nitrogen, cleaning by boiling a solution of sec-butyllithium and 1,1-diphenylethylene in a molar ratio of 1:1 in cyclohexane and drying.

22.8 1 of cyclohexane were then introduced in each case and the amounts of initiator, monomers and potassium alcoholate shown in Table 1 were added. The duration of the polymerization, and the initial and final temperature T$_I$ and T$_F$, respectively, are also stated, the duration of the monomer feed always being small compared with the duration of polymerization.

The temperature of the reaction mixture was controlled by heating or cooling the reactor jacket. After the end of the reaction (consumption of the monomers), titration was carried out with ethanol in Examples 1–7 and the comparative experiment, with ethyl formate in Example 8 and with epoxidized linseed oil in Example 9, until the color disappeared or, in Examples 11 and 12, until a pale yellow color appeared, and the mixture was acidified with a 1.5-fold excess of formic acid. Finally, 34 g of a commercial stabilizer (®Irganox 3052; Ciba-Geigy/Basle) and 82 g of trisnonylphenyl phosphite were added.

The solution was worked up in a devolatilization extruder (three domes, forward and backward devolatilization) at 200° C. and granulation was carried out. 10 g of ®Acrawax, as external lubricant, were added to the granules in a fluid mixer.

For the mechanical measurements, 2 mm thick sheets were produced by compression molding (200° C., 3 min) and standard test specimens were punched out.

TABLE 1

Polymerization and analysis of linear S-SB-S block copolymers and of a star block copolymer (Example 9; Table 1a))

| Example No. | 1 | 2 | 3 | 4 | 5 | 6 |
|---|---|---|---|---|---|---|
| s-BuLi [mmol] | 87.3 | 87.3 | 87.3 | 87.3 | 87.3 | 87.3 |
| Styrene 1 [g] | 1048 | 1048 | 1048 | 1048 | 1048 | 1048 |
| $T_1/T_F$ [° C.] | 40/70 | 40/70 | 40/70 | 40/70 | 40/70 | 40/70 |
| Time [min] | 30 | 30 | 30 | 30 | 30 | 30 |
| K salt [mmol] | 1.09 | 2.18 | 3.27 | 4.37 | 6.55 | 8.73 |
| Li:K ratio | 80:1 | 40:1 | 26.7:1 | 20:1 | 13.3:1 | 10:1 |
| Butadiene 1 [g] | 1172 | 1172 | 1172 | 1172 | 1172 | 1172 |
| Styrene 2 [g] | 1477 | 1477 | 1477 | 1477 | 1477 | 1477 |
| $T_1/T_F$ [° C.] | 52/75 | 52/75 | 52/75 | 52/75 | 52/75 | 52/75 |
| Time [min] | 13 | 13 | 13 | 13 | 13 | 13 |
| Butadiene 2 [g] | 1172 | 1172 | 1172 | 1172 | 1172 | 1172 |
| Styrene 3 [g] | 1477 | 1477 | 1477 | 1477 | 1477 | 1477 |
| $T_1/T_F$ [° C.] | 55/76 | 55/76 | 55/76 | 55/76 | 55/76 | 55/76 |
| Time [min] | 13 | 13 | 13 | 13 | 13 | 13 |
| Butadiene 3 [g] | 1172 | 1172 | 1172 | 1172 | 1172 | 1172 |
| Styrene 4 [g] | 1477 | 1477 | 1477 | 1477 | 1477 | 1477 |
| $T_1/T_F$ [° C.] | 54175 | 54175 | 54/75 | 54/75 | 54/75 | 54/75 |
| Time [min] | 17 | 17 | 17 | 17 | 17 | 17 |
| Styrene 5 [g] | 1148 | 1148 | 1148 | 1148 | 1148 | 1148 |
| $T_1/T_F$ [° C.] | 70/72 | 70172 | 70/72 | 70/72 | 70/72 | 70/72 |
| Time [min] | 40 | 40 | 40 | 40 | 40 | 40 |
| $M_n$ [g/mol.$10^{-3}$] | 130 | 136 | 134 | 131 | 131 | 132 |
| $M_p$ [g/mol.$10^{-3}$] | 155 | 156 | 155 | 150 | 150 | 155 |
| $M_w$ [g/mol.$10^{-3}$] | 162 | 169 | 172 | 166 | 173 | 186 |
| $T_{g,1}$ [° C.]a) | −72/−30 | −50/0 | −48/0 | −45/0 | −40/−5 | −40/−5 |
| $T_{g,2}$ [° C.]b) | 30/89 | 50/90 | 50/90 | 50/90 | 50/90 | 50/90 | a),b) these are 2 glass transition stages which extend in each case over the stated range and can presumably be assigned to the chemically different polymer regions.

TABLE 1a

| Example/Comparison | 7 | 8 | 9 | Comparison |
|---|---|---|---|---|
| s-BuLi [mmol] | 87.3 | 174.6 | 261.9 | 87.3 |
| Styrene 1 [g] | 1048 | 2096 | 2096 | 1048 |
| $T_1/T_F$ [° C.] | 40/70 | 30/75 | 30/75 | 40/70 |
| Time [min] | 30 | 25 | 20 | 30 |
| K salt [mmol] | 17.46 | 4.37 | 4.37 | 42 ml THF |
| Li:K ratio | 5:1 | 20:1 | 20:1 | (instead of K salt) |
| Butadiene 1 [g] | 1172 | 1172 | 1172 | 1172 |
| Styrene 2 [g] | 1477 | 1477 | 1477 | 1477 |
| $T_1/T_F$ [° C.] | 52/75 | 52/75 | 52/75 | 52/78 |
| Time [min] | 13 | 10 | 10 | 11 |
| Butadiene 2 [g] | 1172 | 1172 | 1172 | 1172 |
| Styrene 3 [g] | 1477 | 1477 | 1477 | 1477 |
| $T_1/T_F$ [° C.] | 55/76 | 50/71 | 50/72 | 55/77 |
| Time [min] | 13 | 10 | 10 | 12 |
| Butadiene 3 [g] | 1172 | 1172 | 1172 | 1172 |
| Styrene 4 [g] | 1477 | 1477 | 1477 | 1477 |
| $T_1/T_F$ [° C.] | 54/75 | 50/70 | 50/71 | 54/76 |
| Time [min] | 17 | 14 | 12 | 15 |
| Styrene 5 [g] | 1148 | — | — | 1148 |
| $T_1/T_F$ [° C.] | 70/72 | | | 65/67 |
| Time [min] | 40 | | | 30 |
| Coupling agent [g] | — | 6.46c) | 21.34d) | — |

TABLE 1a-continued

| Example/Comparison | 7 | 8 | 9 | Comparison |
|---|---|---|---|---|
| $M_n$ [g/mol.$10^{-3}$] | 124 | 121 | 90 | 117 |
| $M_p$ [g/mol.$10^{-3}$] | 147 | 151 | — | 159 |
| $M_w$ [g/mol.$10^{-3}$] | 174 | 150 | 175 | 181 |
| $T_{g,1}$ [° C.]a) | −40/−5 | −45/0 | −45/0 | −32/−2 |
| $T_{g,2}$ [° C.]b) | 50–90 | 50–90 | 50–90 | 50–90 | a), b) cf. above
c) Ethyl formate;
d) ®Edenol B 316 from Henkel

TABLE 2

Mechanical properties (all values in [N/mm$^2$])

| Example No. | 1 | 2 | 3 | 4 | 5 | 6 |
|---|---|---|---|---|---|---|
| Yield stress | 4.8 | 2.2 | 1.8 | 1.50 | 1.35 | 1.42 |
| Breaking stress | 25.5 | 25.1 | 23.3 | 21.3 | 21.5 | 20.2 |
| Breaking stress (%) | 718 | 750 | 767 | 803 | 840 | 865 |
| Stress 200% | 4.5 | 4.0 | 3.5 | 2.9 | 2.7 | 2.7 |
| Stress 400% | 10.5 | 8.7 | 7.6 | 6.4 | 5.8 | 5.5 |
| Stress 600% | 18.1 | 15.3 | 13.5 | 11.3 | 10.5 | 9.8 |

| Example/Comparison | 7 | 8 | 9 | Comparison |
|---|---|---|---|---|
| Yield stress | 1.56 | 1.51 | 1.42 | 1.39 |
| Breaking stress | 16.4 | 20.2 | 18.5 | 20.4 |
| Elongation at break (%) | 738 | 880 | 832 | 851 |
| Stress 200% | 3.1 | 2.6 | 2.5 | 2.7 |
| Stress 400% | 6.9 | 5.4 | 5.2 | 5.6 |
| Stress 600% | 11.6 | 9.7 | 9.4 | 10.2 |

TABLE 3

Rheographic measurement (determination of the heat stability) at 250° C.

| Time [min] | Example 4 Pressure [bar] | Comparative experiment Pressure [bar] |
|---|---|---|
| 0 | 9 | 10 |
| 10 | 9.5 | 21 |
| 20 | 10 | 38 |
| 30 | 14.5 | 80 |
| 40 | 20 | above measuring range |

The rheographic measurements were carried out in an MFI apparatus from Göttfert. The pressure increase, which is a measure of the increasing crosslinking of the sample at the chosen temperature, was monitored at constant flow. Since the materials are also especially suitable for thin films, extremely low gel content, ie. little tendency to crosslink at a processing temperature of, for example, 200 to 220° C., is important.

We claim:
1. An elastomeric block copolymer of the structure

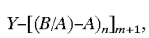

where A is a vinylaromatic block forming a hard phase, (B/A) is a random copolymer block of vinylaromatic monomer and of diene forming a soft phase, X is the radical of an (m+1)-functional initiator, Y is the radical of an (m+1)-functional coupling agent and m and n are natural numbers from 1 to 10, wherein the elastomeric block copolymer has a monomer composition comprising 25–60% by weight of diene and 75–40% by weight of vinylaromatic compound, the glass transition temperature $T_g$ of block A is above 25° C. and that of block (B/A) is below 25° C., and the proportion of the hard phase in the elastomeric block copolymer is from 5 to 40% by volume and the relative amount of 1,2 linkages of the polydiene, based on the sum of 1,2- and 1,4-cis/trans-linkages, is less than 15%.

2. A block copolymer as claimed in claim 1, wherein the relative amount of 1,2 linkages of the polydiene is less than 12%.

3. A block copolymer as claimed in claim 1, wherein $T_g$ of the hard phase is over 50° C. and $T_g$ of the soft phase is less than 5° C.

4. A block copolymer as claimed in claim 1, wherein the vinylaromatic monomer is selected from styrene, α-methylstyrene, vinyltoluene and 1,1-diphenylethylene, and the diene from butadiene and isoprene.

5. A block copolymer as claimed in claim 1, wherein the B/A block has a molecular weight of from 2000 to 250,000 [g/mol]and the A block has a molecular weight of from 1000 to 200,000 [g/mol].

6. An elastomeric block copolymer as claimed in claim 1 wherein the elastomeric block copolymer is of the of the structure

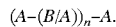

7. A block copolymer as claimed in claim 1, having a gross monomer composition comprising 75–40% by weight of styrene and 25–60% by weight of butadiene.

8. A block copolymer as claimed in claim 1, wherein the soft block (B/A) has a butadiene content of from 35 to 70% and a styrene content of from 65 to 30%.

9. A block copolymer as claimed in claim 1, which is of one of the formulae A–(B/A)–A, X–[–(B/A)–A]$_2$ and Y–[–(B/A)–A]$_2$.

10. A block copolymer as claimed in claim 1, wherein the soft 35 phase (B/A) is subdivided into a plurality of blocks of the formulae 12 to 14:

 (12)

 (13)

 (14).

11. A block copolymer as claimed in claim 1, wherein a plurality of blocks (B/A) are present and the vinylaromatic/diene ratio is different in the individual blocks (B/A).

12. A block copolymer as claimed in claim 1, wherein p repeating segments (part-blocks) with changing monomer composition are present within a block (B/A), as formed by addition of p portions of the monomers, where p is an integer from 2 to 10.

13. A block copolymer as claimed in claims wherein the composition within a block changes within the limits of claim 1 in such a way that a composition gradient $(B/A)_{p1}<<(B/A)_{p2}<<(B/A)_{p3}$ . . . occurs in each segment (part-block), the is glass transition temperature $T_g$ of each part-block being less than 25° C.

14. A block copolymer as claimed in claim 1, wherein a plurality of blocks (B/A) or A, each having a different molecular weight per molecule, are present.

* * * * *

UNITED STATES PATENT AND TRADEMARK OFFICE
CERTIFICATE OF CORRECTION

PATENT NO.   : 6,197,889
DATED        : March 6, 2001
INVENTOR(S)  : KNOLL et al.

It is certified that error appears in the above-identified patent and that said Letters Patent is hereby corrected as shown below:

Col. 10, claim 1, line 63, "$X\text{-}[(B/A]A^n]_{m+1}$, or" should be --$X\text{-}[(B/A]A_n]_{m+1}$, or--.

Col. 11, claim 6, line 32, "of the of the" should be --of the --.

Col. 12, claim 13, line 26, "claimed in claims" should be --claimed in claim 12--.

Col. 12, claim 13, line 30, delete "is".

Signed and Sealed this

Fifth Day of June, 2001

Attest:

*Attesting Officer*

NICHOLAS P. GODICI

*Acting Director of the United States Patent and Trademark Office*